US008843480B2

(12) United States Patent
Bandara

(10) Patent No.: US 8,843,480 B2
(45) Date of Patent: Sep. 23, 2014

(54) SERVER, INFORMATION-MANAGEMENT METHOD, INFORMATION-MANAGEMENT PROGRAM, AND COMPUTER-READABLE RECORDING MEDIUM WITH SAID PROGRAM RECORDED THEREON, FOR MANAGING INFORMATION INPUT BY A USER

(75) Inventor: Udana Bandara, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/879,473

(22) PCT Filed: Aug. 23, 2011

(86) PCT No.: PCT/JP2011/068984
§ 371 (c)(1),
(2), (4) Date: Apr. 15, 2013

(87) PCT Pub. No.: WO2012/077388
PCT Pub. Date: Jun. 14, 2012

(65) Prior Publication Data
US 2013/0246410 A1    Sep. 19, 2013

(30) Foreign Application Priority Data

Dec. 7, 2010    (JP) .................................. 2010-272803

(51) Int. Cl.
*G06F 17/30* (2006.01)
*G06Q 10/10* (2012.01)
(52) U.S. Cl.
CPC .......... *G06F 17/30241* (2013.01); *G06Q 10/10* (2013.01)
USPC ....................................... 707/724; 455/456.1
(58) Field of Classification Search
USPC ....................................... 707/724
See application file for complete search history.

(56) References Cited

U.S. PATENT DOCUMENTS 7,260,473 B2 *   8/2007   Abe et al. ...................... 701/420
7,305,245 B2 *  12/2007   Alizadeh-Shabdiz
                           et al. .......................... 455/456.6

(Continued)

FOREIGN PATENT DOCUMENTS

JP    2010-027031    *    2/2010
JP    2010-133904 A       6/2010

OTHER PUBLICATIONS

Jinyang Li John Jannotti Douglas S. J. De Couto David R. Karger, Robert Morris "A Scalable Location Service for Geographic Ad Hoc Routing", 2000, ACM.*

(Continued)

*Primary Examiner* — Polina Peach
(74) *Attorney, Agent, or Firm* — Sughrue Mion, PLLC

(57) ABSTRACT

A server includes: an input information database 14 for storing input information in which position information indicating a geographical position and a user ID specifying a user having performed an input operation relating to the geographical position are associated with each other; and an association unit 18 for, when it is determined that the plurality of common users performed the input operation in the predetermined number or more of common geographical ranges, associating multiple pieces of input information, which correspond to the plurality of common users and respectively include pieces of position information indicating geographical positions included in a common geographical range, with each other by extracting the multiple pieces of input information and then allocating a common identifier to the extracted multiple pieces of input information, for each of the predetermined number or more of common geographical ranges.

16 Claims, 19 Drawing Sheets

(56) References Cited

U.S. PATENT DOCUMENTS

| | | | |
|---|---|---|---|
| 7,826,965 B2* | 11/2010 | Sadri et al. | 701/438 |
| 8,274,916 B2* | 9/2012 | Kim et al. | 370/254 |
| 8,396,888 B2* | 3/2013 | Cheng et al. | 707/774 |
| 8,433,512 B1* | 4/2013 | Lopatenko et al. | 701/426 |
| 2008/0104227 A1* | 5/2008 | Birnie et al. | 709/224 |
| 2008/0104649 A1* | 5/2008 | Naaman et al. | 725/116 |
| 2010/0005393 A1* | 1/2010 | Tokashiki et al. | 715/716 |
| 2011/0022469 A1* | 1/2011 | Fukui et al. | 705/14.58 |
| 2011/0064000 A1* | 3/2011 | Kim et al. | 370/255 |
| 2011/0167079 A1* | 7/2011 | Haridasan et al. | 707/769 |
| 2012/0278320 A1* | 11/2012 | Ogura | 707/736 |

OTHER PUBLICATIONS

International Preliminary Report on Patentability dated Jun. 20, 2013 issued in International Application No. PCT/JP2011/068984.

* cited by examiner

Fig.7

| LOCATION ID | GEOGRAPHICAL INFORMATION | FACILITY-RELATED INFORMATION | | |
|---|---|---|---|---|
| | | FACILITY NAME | ADDRESS | ... |
| 0001 | (x1,y1,r1) | SHOP a | ... | ... |
| 0002 | (x2,y2,r2) | SHOP b | ... | ... |
| 0003 | (x3,y3,r3) | SHOP c | ... | ... |
| ... | | ... | ... | ... |

Fig.8

| USER ID | LOCATION INFORMATION |
|---|---|
| USER A | R11(x11, y11) |
| | R12(x12, y12) |
| | R13(x13, y13) |
| | R14(x14, y14) |
| | ... |
| USER B | R21(x21, y21) |
| | R22(x22, y22) |
| | R23(x23, y23) |
| | R24(x24, y24) |
| | ... |
| USER C | R31(x31, y31) |
| | R32(x32, y32) |
| | R33(x33, y33) |
| | ... |
| ... | ... |

Fig.9

| USER ID | LOCATION INFORMATION | INPUT FACILITY INFORMATION | | CATEGORY NAME | LOCATION ID |
|---|---|---|---|---|---|
| | | FACILITY NAME | ... | | |
| USER A | R11(x11, y11) | Ca CAFÉ | ... | CAFÉ | |
| | R12(x12, y12) | Ba BOOKSHOP | ... | BOOKSHOP | |
| | R13(x13, y13) | Bb BOOKSHOP | ... | BOOKSHOP | |
| | R14(x14, y14) | Cc CAFÉ | ... | CAFÉ | |
| | ... | ... | ... | ... | |
| USER B | R21(x21, y21) | Ba BOOKSTORE | ... | MAGAZINE | |
| | R22(x22, y22) | Ca COFFEE SHOP | ... | TEA | |
| | R23(x23, y23) | Bc BOOKSTORE | ... | MAGAZINE | |
| | R24(x24, y24) | Cb COFFEE SHOP | ... | TEA | |
| | ... | ... | ... | ... | |
| USER C | R31(x31, y31) | Ca | ... | STUDY PLACE | |
| | R32(x32, y32) | Cb | ... | STUDY PLACE | |
| | R33(x33, y33) | Cc | ... | STUDY PLACE | |
| | ... | ... | ... | ... | |
| ... | ... | ... | ... | ... | |

*Fig.10*

| CATEGORY DICTIONARY DATA |
| --- |
| CAFÉ,TEA,STUDY PLACE |
| BOOKSHOP,MAGAZINE |
| ... |

*Fig.11*
(a)
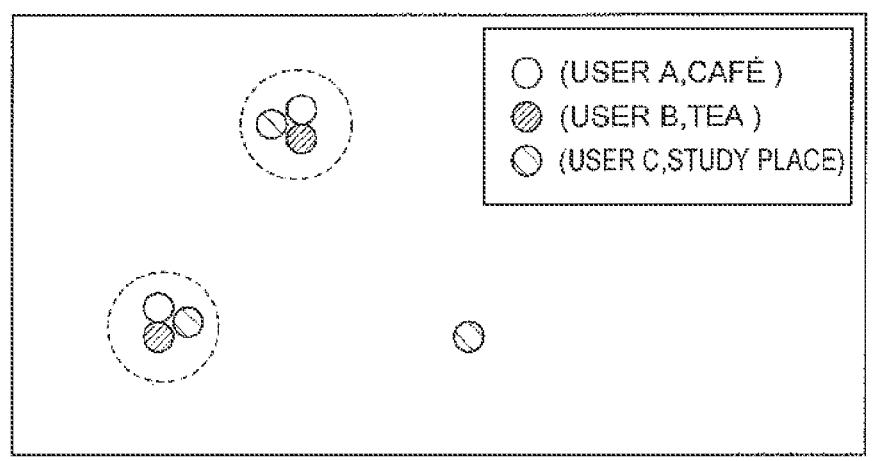
(b)
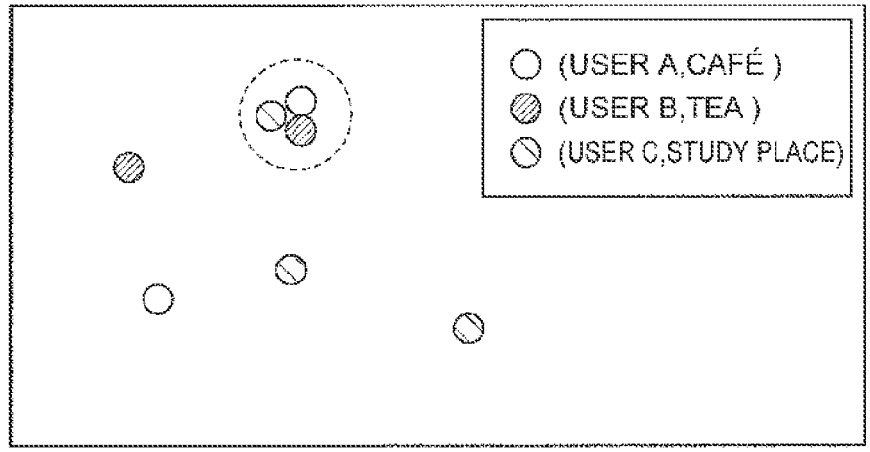

Fig.12
(a)
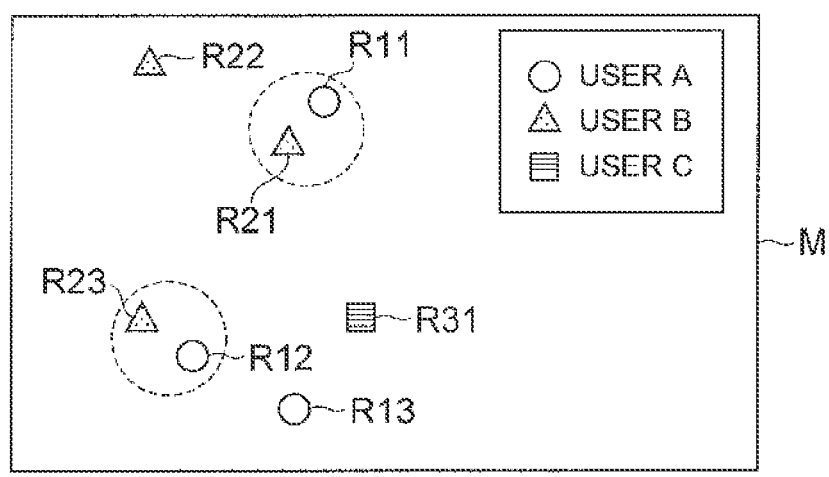
(b)
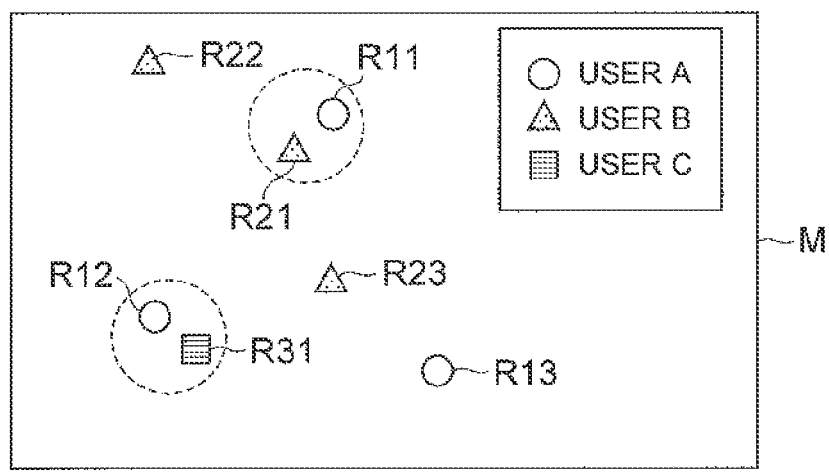

Fig.13
(a)
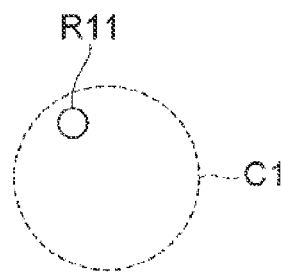
(b)
| USER ID | LOCATION INFORMATION | INPUT FACILITY INFORMATION | LOCATION ID |
|---|---|---|---|
| USER A | R11(x11, y11) | ... | |
| USER ID | LOCATION INFORMATION | INPUT FACILITY INFORMATION | LOCATION ID |
|---|---|---|---|
| USER A | R11(x11, y11) | ... | 0001 |

Fig.14
(a)
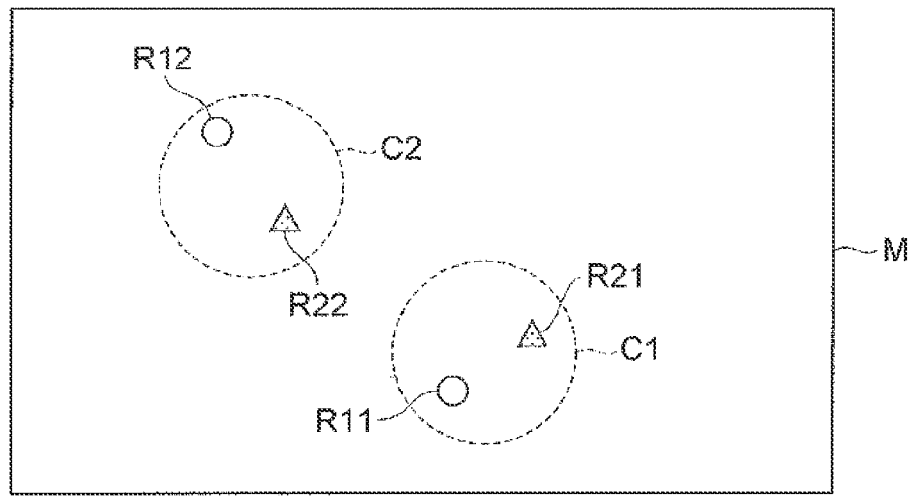
(b)
| USER ID | LOCATION INFORMATION | INPUT FACILITY INFORMATION | LOCATION ID |
|---|---|---|---|
| USER A | R11(x11, y11) | ... | |
| USER A | R12(x12, y12) | ... | |
| USER B | R21(x21, y21) | ... | |
| USER B | R22(x22, y22) | ... | |
| USER ID | LOCATION INFORMATION | INPUT FACILITY INFORMATION | LOCATION ID |
|---|---|---|---|
| USER A | R11(x11, y11) | ... | 0001 |
| USER A | R12(x12, y12) | ... | 0002 |
| USER B | R21(x21, y21) | ... | 0001 |
| USER B | R22(x22, y22) | ... | 0002 |

(a)

(b)

| USER ID | LOCATION INFORMATION | INPUT FACILITY INFORMATION | LOCATION ID |
|---|---|---|---|
| USER A | R11(x11, y11) | ... | 0001 |
| USER A | R12(x12, y12) | ... | 0002 |
| USER B | R21(x21, y21) | ... | 0001 |
| USER B | R22(x22, y22) | ... | 0002 |
| USER C | R31(x31, y31) | ... | 0003 |
| USER C | R32(x32, y32) | ... | 0004 |
| USER D | R41(x41, y41) | ... | 0003 |
| USER D | R42(x42, y42) | ... | 0004 |

(a)

(b)

| USER ID | LOCATION INFORMATION | INPUT FACILITY INFORMATION | LOCATION ID |
|---------|----------------------|----------------------------|-------------|
| USER A  | R11(x11, y11)        | ...                        | 0001        |

*Fig.18*
(a)
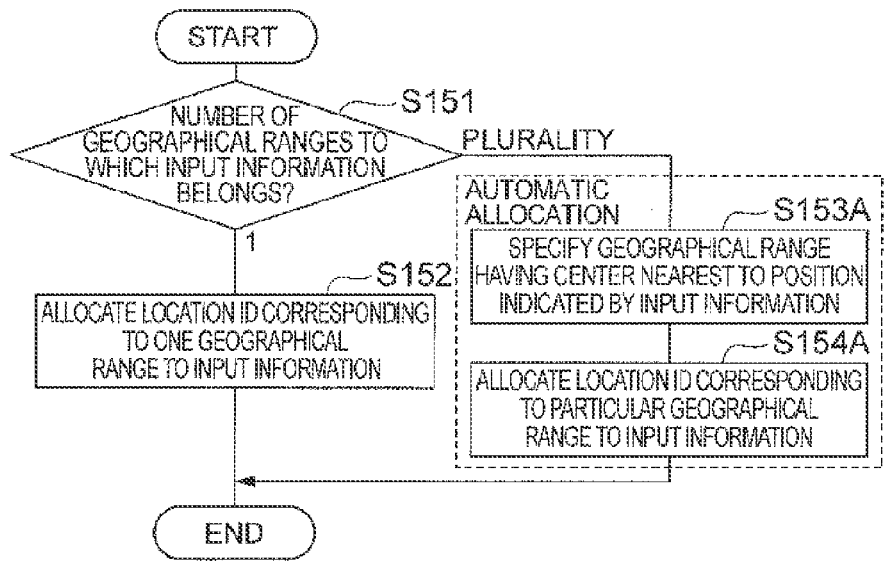
(b)
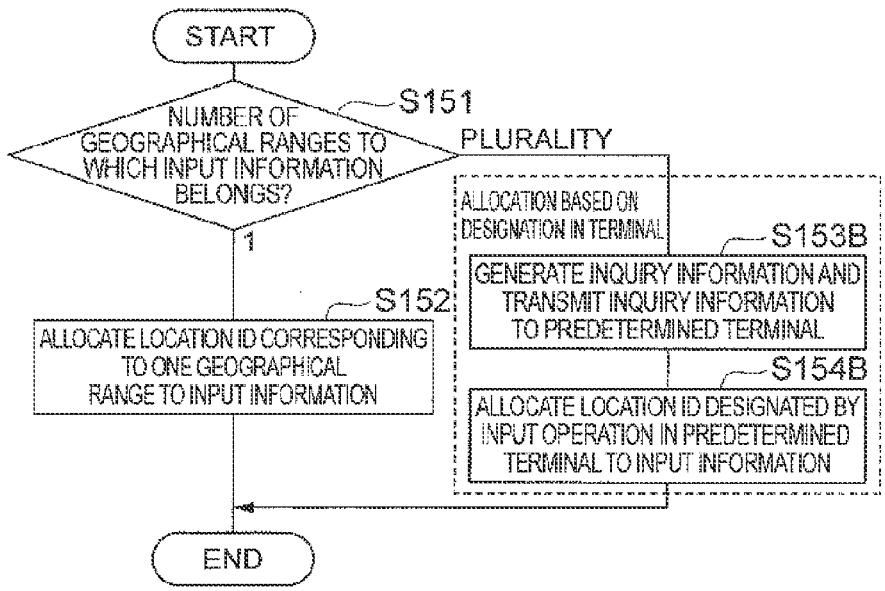

SERVER, INFORMATION-MANAGEMENT METHOD, INFORMATION-MANAGEMENT PROGRAM, AND COMPUTER-READABLE RECORDING MEDIUM WITH SAID PROGRAM RECORDED THEREON, FOR MANAGING INFORMATION INPUT BY A USER

CROSS REFERENCE TO RELATED APPLICATIONS

This application is a National Stage of International Application No. PCT/JP2011/068984 filed Aug. 23, 2011, claiming priority based on Japanese Patent Application No. 2010-272803 filed Dec. 7, 2010, the contents of all of which are incorporated herein by reference in their entirety.

TECHNICAL FIELD

An aspect of the present invention relates to a server, a method, a program, and a computer-readable recording medium with said program recorded thereon, for managing information inputted by a user.

BACKGROUND ART

An information processing system which searches for information corresponding to a predetermined condition and provides a user with the information has been known from the past. For example, patent literature 1 as mentioned below discloses a destination searching device which enables an easy search for a destination even where the name or the position of the destination is not known. This device searches for a destination based on a database stipulating names, positions, and categories of places which can be employed as the destination or related places, selected categories, names or categories of inputted related places, and set positional relation.

CITATION LIST

Patent Literature

Patent Literature 1: Japanese Unexamined Patent Application Publication No. 2010-133904

SUMMARY OF INVENTION

Technical Problem

As a method for registering place information in the database as described above, not only a method of collectively preparing place information by a database manager but a method of generating and registering place information based on information inputted by each user may also be taken into consideration. However, in the latter case, when a plurality of users input related information for a certain place, the information inputted by each user may be different from the information inputted by another user for the certain place. Then, it is difficult for a server managing the database to identify the multiple pieces of different information as information of an identical place. For example, when there is a difference in the location information or inputted facility names, it is difficult to properly combine the place information at the server side.

Therefore, it is required to properly combine pieces of information on a place inputted by respective users.

Solution to Problem

A server in accordance with an aspect of the present invention includes: an input information storage means configured to store input information in which position information indicating a geographical position and a user ID specifying a user having performed an input operation relating to the geographical position are associated with each other; a decision means configured to determine whether a plurality of common users have performed the input operation in a predetermined number or more of common geographical ranges, by referring to the input information storage means; an association means configured to, when it has been determined that the plurality of common users have performed the input operation in the predetermined number or more of common geographical ranges, associate multiple pieces of input information, which correspond to the plurality of common users and respectively include pieces of position information indicating geographical positions included in a common geographical range, with each other by extracting the multiple pieces of input information and then allocating a common identifier to the extracted multiple pieces of input information, for each of the predetermined number or more of common geographical ranges, wherein the common identifier is specific to each of the common geographical ranges; and a registration means configured to register multiple pieces of input information associated with each other for each of the common geographical ranges in a result storage means by the association means.

An information management method in accordance with an aspect of the present invention, which is executed by a server, includes: a decision step of, by referring to an input information storage means that stores input information in which position information indicating a geographical position and a user ID specifying a user having performed an input operation relating to the geographical position are associated with each other, determining whether a plurality of common users have performed the input operation in a predetermined number or more of common geographical ranges; an association step of, when it has been determined that the plurality of common users have performed the input operation in the predetermined number or more of common geographical ranges, associating multiple pieces of input information, which correspond to the plurality of common users and respectively include pieces of position information indicating geographical positions included in a common geographical range, with each other by extracting the multiple pieces of input information and then allocating a common identifier to the extracted multiple pieces of input information, for each of the predetermined number or more of common geographical ranges, wherein the common identifier is specific to each of the common geographical ranges; and a registration step of registering multiple pieces of input information associated with each other for each of the common geographical ranges in the result storage means by the association means.

An information management program in accordance with an aspect of the present invention allows a computer to function as: an input information storage means configured to store input information in which position information indicating a geographical position and a user ID specifying a user having performed an input operation relating to the geographical position are associated with each other; a decision means configured to determine whether a plurality of common users have performed the input operation in a predetermined number or more of common geographical ranges, by referring to the input information storage means; an association means configured to, when it has been determined that the plurality of common users have performed the input operation in the predetermined number or more of common geographical ranges, associate multiple pieces of input information, which correspond to the plurality of common users and respectively include pieces of position information indicating geographical positions included in a common geographical range, with each other by extracting the multiple pieces of input information and then allocating a common identifier to the extracted multiple pieces of input information, for each of the predetermined number or more of common geographical ranges, wherein the common identifier is specific to each of the common geographical ranges; and a registration means configured to register multiple pieces of input information associated with each other for each of the common geographical ranges in a result storage means by the association means.

A computer-readable recording medium in accordance with an aspect of the present invention records an information management program therein, wherein the information management program allows a computer to function as: an input information storage means configured to store input information in which position information indicating a geographical position and a user ID specifying a user having performed an input operation relating to the geographical position are associated with each other; a decision means configured to determine whether a plurality of common users have performed the input operation in a predetermined number or more of common geographical ranges, by referring to the input information storage means; an association means configured to, when it has been determined that the plurality of common users have performed the input operation in the predetermined number or more of common geographical ranges, associate multiple pieces of input information, which correspond to the plurality of common users and respectively include pieces of position information indicating geographical positions included in a common geographical range, with each other by extracting the multiple pieces of input information and then allocating a common identifier to the extracted multiple pieces of input information, for each of the predetermined number or more of common geographical ranges, wherein the common identifier is specific to each of the common geographical ranges; and a registration means configured to register multiple pieces of input information associated with each other for each of the common geographical ranges by the association means in a result storage means.

According to this aspect, it is determined based on input information whether a plurality of common users performed input operations in a predetermined number or more of common geographical ranges. Further, when it has been determined that a plurality of common users performed input operations in a predetermined number or more of common geographical ranges, pieces of input information of the plurality of common users corresponding to each of the common geographical ranges are associated with each other by a common identifier and are then registered. In this way, pieces of input information are grouped in consideration of overlapping of positions at which user's input operations have been performed and a common identifier is then given to the grouped input information, so that pieces of information relating to places inputted by respective users can be properly combined.

A server in accordance with another aspect may further include a facility storage means configured to store facility information which is related to a facility and at least includes a facility ID specifying a facility and geographical information indicating a geographical range of the facility, wherein the common geographical range is the geographical range indicated by the geographical information, the common identifier is the facility ID, and the facility ID corresponds to the geographical information corresponding to the extracted multiple pieces of input information.

In this case, a facility ID of a particular facility is given to multiple pieces of input information, which are included in a geographical range of the particular facility and correspond to a plurality of common users. Accordingly, pieces of information related to a place inputted by respective users can be collected as information concerning one facility.

In a server in accordance with another aspect, when a plurality of geographical positions indicated by extracted multiple pieces of input information are included in a geographical range indicated by one piece of facility information and a geographical range indicated by another piece of facility information, the association means may compare a midpoint of the plurality of geographical positions and a center of each geographical range with each other and allocate a facility ID corresponding to a geographical range having a center nearest to the midpoint to the multiple pieces of input information.

In this case, when a plurality of candidates for a facility (geographical range) with respect to multiple pieces of input information exist, a facility ID to be allocated to the multiple pieces of input information is determined based on a positional relation between a midpoint of positions indicated by input information and each geographical range. As a result, it is possible to automatically determine a facility which is highly probable to correspond to multiple pieces of input information.

In a server in accordance with another aspect, when a plurality of geographical positions indicated by extracted multiple pieces of input information are included in a geographical range indicated by one piece of facility information and a geographical range indicated by another piece of facility information, the association means may generate inquiry information for inquiring about which facility the multiple pieces of input information shall be associated with, transmit the inquiry information to a predetermined terminal, receive reply information indicating a facility designated by a user of the terminal in response to the inquiry information from the terminal, and allocate a facility ID indicated by the received reply information to the multiple pieces of input information.

In this case, when a plurality of candidates for a facility (geographical range) with respect to multiple pieces of input information exist, a location ID to be allocated to the multiple pieces of input information is determined based on a user operation. Therefore, a facility corresponding to multiple pieces of input information can be determined just as the user's request.

A server in accordance with another aspect further may include: a receiving means configured to receive a request signal including the position information indicating a position of a terminal of a user from the terminal; a search means configured to read facility information of facilities existing within a predetermined geographical range from the position indicated by the position information from the facility storage means, by referring to the facility storage means and the result storage means based on the position information in the request signal received by the receiving means; and a transmitting means configured to transmit the facility information read by the search means to the terminal.

In this case, facility information of facilities existing within a predetermined range from the position of the user terminal is extracted and is then transmitted to a terminal. As a result, the user can obtain information of facilities near to himself or herself.

In a server in accordance with another aspect, the position information may be information indicating the geographical position by at least latitude and longitude.

In a server in accordance with another aspect, the position information may be information indicating the geographical position by latitude, longitude, and altitude, and the geographical range may be a range indicated by a three-dimensional shape.

Advantageous Effects of Invention

According to the present invention, since a common identifier is given to a plurality of input information based on overlapping of positions wherein users' input operations have been performed, it is possible to properly combine information relating to places inputted by respective users.

BRIEF DESCRIPTION OF DRAWINGS

FIG. 7 is a view illustrating an example of facility information.

FIG. 8 is a view illustrating an example of input operation position information.

FIG. 9 is a view illustrating an example of input information.

FIG. 10 is a view illustrating an example of category dictionary data.

FIGS. 11(a) and 11(b) are views for describing a method of generating category dictionary data.

FIGS. 12(a) and 12(b) are views for describing a decision method by a decision unit.

FIG. 13(a) is a view showing a relation between a geographical range of a facility and an input position of facility information, and FIG. 13(b) is a view showing allocation of a location ID to input information.

FIG. 14(a) is a view showing a relation between a geographical range of a facility and an input position of facility information, and FIG. 14(b) is a view showing allocation of a location ID to input information.

FIGS. 18(a) and 18(b) are flowcharts illustrating processes of allocating a location ID to input information within the group in FIG. 17.

DESCRIPTION OF EMBODIMENTS

Figure 1:
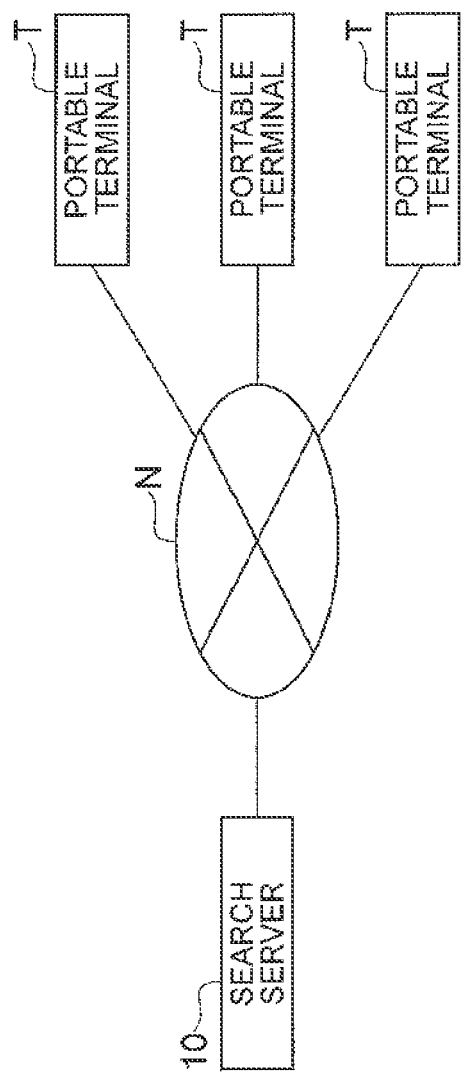
FIG. 1 is a view illustrating the entire configuration of a system including a search server according to an aspect.

Hereinafter, embodiments of the present invention will be described with reference to the accompanying drawings. In the present embodiment, a server according to the present invention is applied to a search server. Note that, in the following description of the drawings, the same reference numerals are given to the same or equivalent elements and repeated description thereof is omitted.

Referring to FIGS. 1 to 16, the functional and configuration of a search server 10 according to an embodiment will be described. The search server 10 is a computer system which transmits information (facility information) relating to a facility to a portable terminal T possessed by a user in response to a request from the portable terminal T. Meanwhile, examples of the facility include a store or hotel, a resort area, and a public facility, and the kinds of the facility are not limited to the examples. In the portable terminal T, received facility information is collectively displayed for each category of the facility. However, this category has been given in advance by the user himself or herself.

As shown in FIG. 1, the search server 10 is connected with a plurality of portable terminals T through a communication network N. Note that, although three portable terminals T are shown in FIG. 1, any number of portable terminals T is okay. Examples of the portable terminal T may include high-performance portable phones (smart phones) or Portable Digital Assistants (PDA), and the kinds of the portable terminals are not limited to the examples.

Before describing the function and construction of the search server 10 in detail, a screen displayed on the portable terminal T cooperating with the search server 10 is described first in order to facilitate the understanding thereof.

Figure 2:
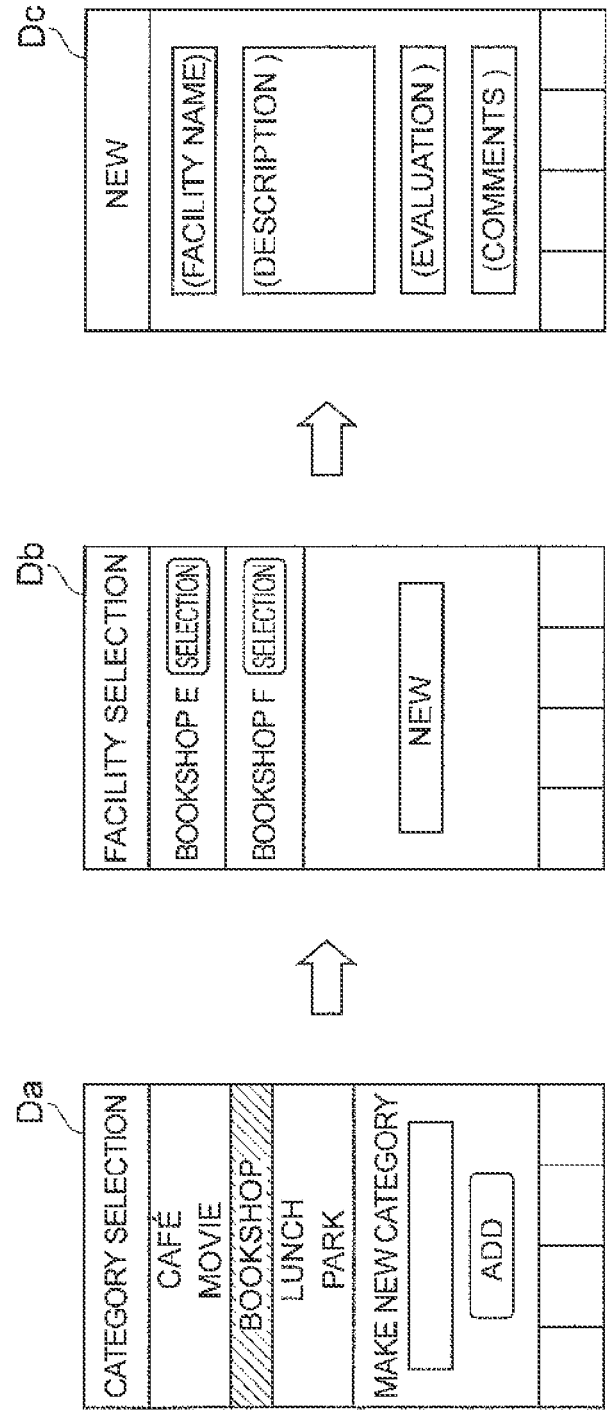
FIG. 2 is a view illustrating examples of screens for giving a category, which are displayed on the portable terminal shown in FIG. 1.

FIG. 2 is a view illustrating examples of screens for input of information on a facility. A user inputs information of the facility itself in which the user is interested or a name (category name) of the category for classifying the facility, through the screens as shown in FIG. 2. The category name is a term individually given to each facility by the user.

First, a user selects a category name in the screen Da. The user may either select one category from a list of categories (movie, bookshop, lunch, etc.) which the user has already registered, or make a new category not included in the list by inputting the category and then pressing an "ADD" button. In the example shown in FIG. 2, the category named "bookshop" has been selected.

Then, the user selects a facility in the screen Db. The user may select a facility from a list of facilities (bookshops E and F) located around the user. The portable terminal T is equipped with a Global Positioning System (GPS) function and transmits a list request signal, which includes position information indicating a current position of the terminal itself obtained by the function, to the search server 10. Thereafter, the portable terminal T receives a list (candidate facility list) of facility information set from the search server 10 in response to the signal and displays the received list on the screen Db. Further, the user may press a "NEW INPUT" button within the screen Db to cause a screen Dc to be displayed, and then input information of a facility not included in the list. The information inputted by the user may include a facility name or an address, and there is no restriction on the contents of the facility information inputted by the user.

When the user has completed the input operation relating to the facility, the portable terminal T generates input information based on the operation and transmits the input information to the search server 10. When a facility has been selected from a list, the input information includes a user ID uniquely specifying the user, position information indicating a current position of the portable terminal T by latitude and longitude, and a facility ID of the facility selected by the user. When the user has input a new facility, the input information includes the user ID, position information, and facility information (input facility information) inputted by the user.

Figure 3:
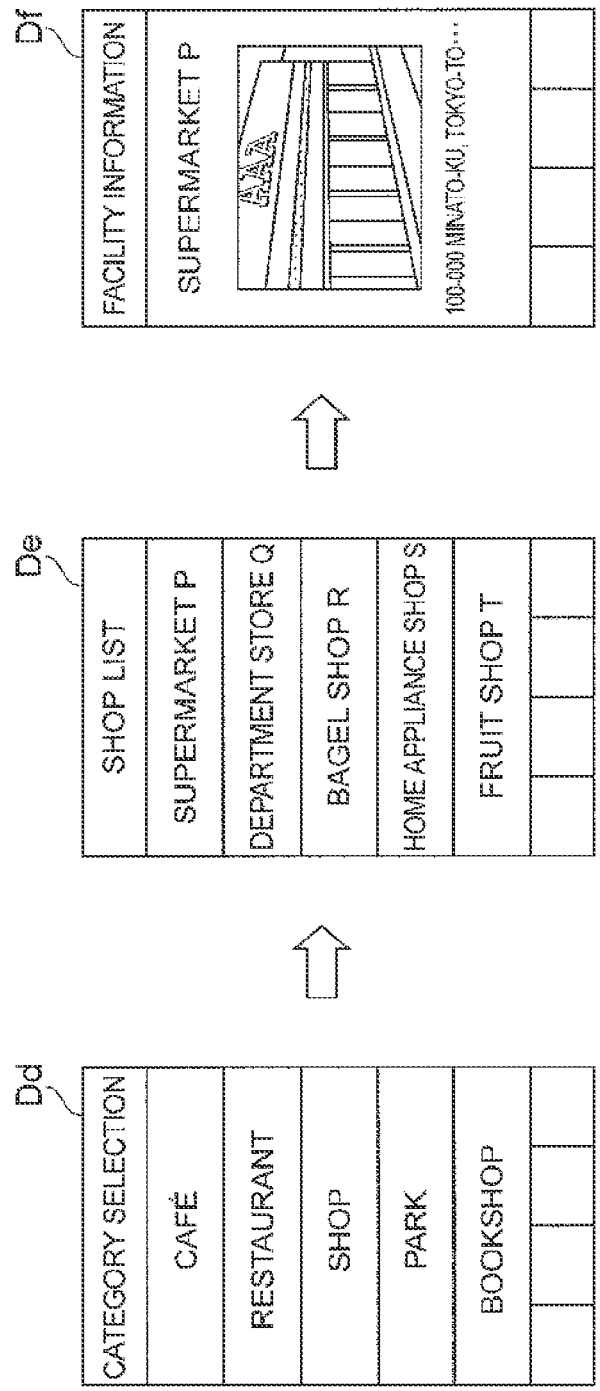
FIG. 3 is a view illustrating examples of facility display screens, which are displayed on the portable terminal shown in FIG. 1.

FIG. 3 is a view illustrating examples of screens displaying facility information corresponding to a request from a user. When a user opens a screen Dd in order to perform facility search, a list of category names registered and stored in the portable terminal T by the user himself or herself is displayed. When the user selects one category in the screen Dd, the portable terminal T generates a request signal including the selected category name (designated category name) and position information indicating a current position of the portable terminal T by latitude and longitude, and transmits the generated request signal to the search server 10. Thereafter, the portable terminal T receives facility information transmitted from the search server 10 in response to the request signal and displays the received information as a list (screen De). In the example shown in FIG. 3, the category name "shop" has been selected and facilities belonging to the selected category have been displayed. If the user selects one facility in the screen De, the portable terminal T displays detailed information of the facility (screen Df).

Figure 4:
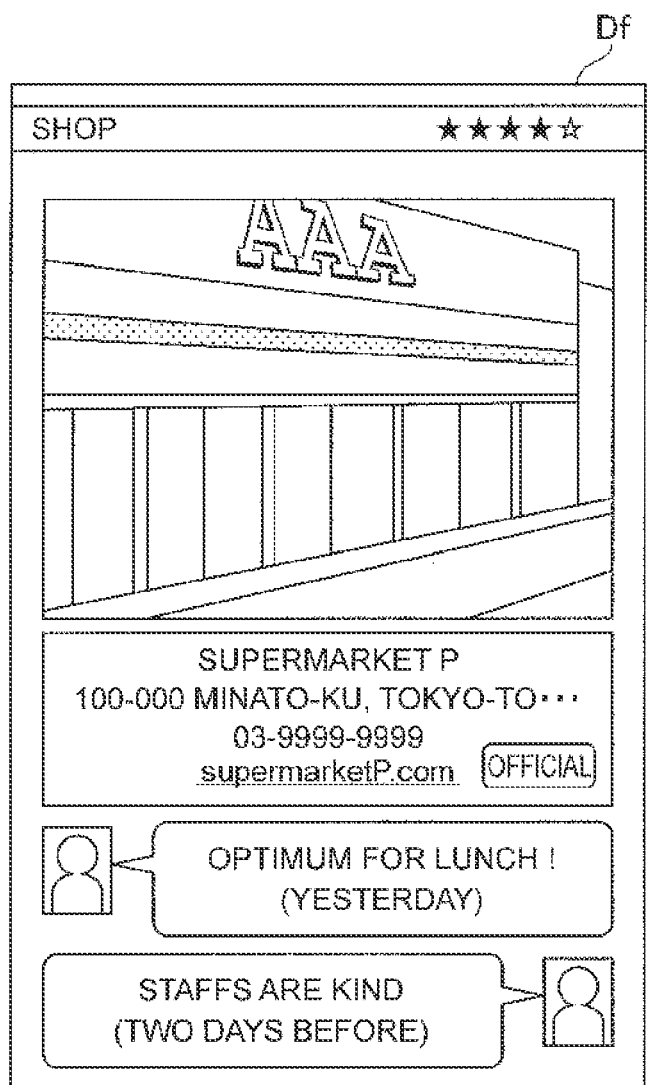
FIG. 4 is a view illustrating the screens shown in FIG. 3 in more detail.

The configuration of the screen Df is shown in more detail in FIG. 4. In the top portion of the screen, a category name of a facility given by the user of the portable terminal T and a ranking indicated by a number of stars are displayed. At the central part of the screen, a photograph, name, address, phone number, and URL of a web site of the facility are displayed. The "official" mark at the right side of the URL indicates that the URL is an official page (a web page which has been formally approved by the facility). In the bottom portion of the screen, comments of respective users on the facility and the time of attachment of the comments are displayed.

Figure 5:
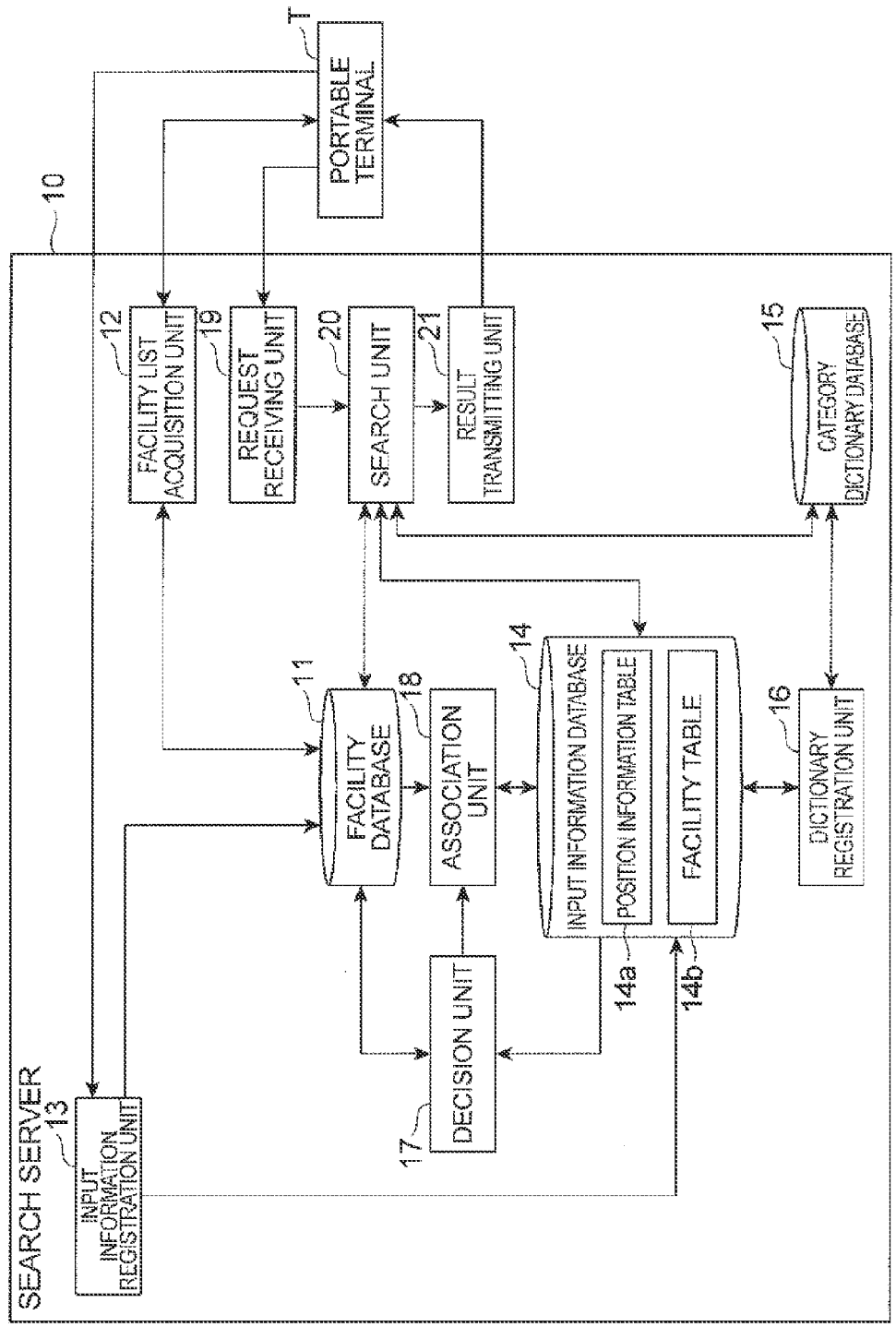
FIG. 5 is a block diagram showing the functional configuration of the search server shown in FIG. 1.

Hereinafter, a functional configuration of the search server 10 will be described in detail. As shown in FIG. 5, the search server 10 includes, as functional components, a facility database (facility storage means) 11, a facility list acquisition unit 12, an input information registration unit 13, an input information database 14, a category dictionary database 15, a dictionary registration unit 16, a decision unit (decision means) 17, an association unit (association means, registration means) 18, a request receiving unit (receiving means) 19, a search unit (search means) 20, and a result transmitting unit (transmitting means) 21.

Figure 6:
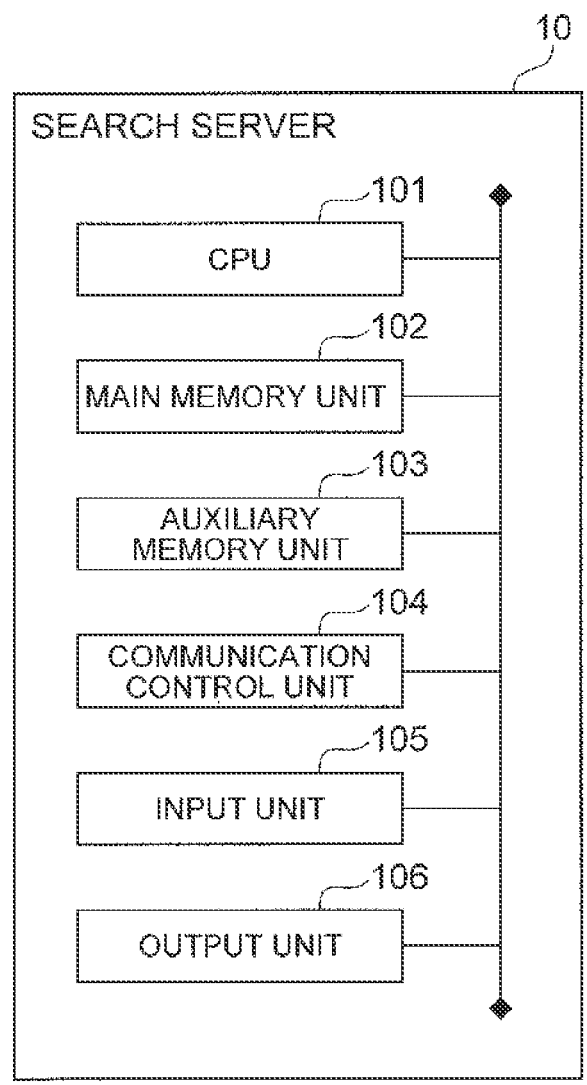
FIG. 6 is a view illustrating a hardware configuration of the search server shown in FIG. 1.

As shown in FIG. 6, the search server 10 includes a CPU 101 for executing an operating system or an application program, a main memory unit 102 configured by a ROM and a RAM, an auxiliary memory unit 103 configured by a hard disc, etc., a communication control unit 104 configured by a network card, etc., an input unit 105 including a keyboard, a mouse, etc., and an output unit 106 including a monitor, etc. Each function of the search server 10 is implemented by reading predetermined software on the CPU 101 or the main memory unit 102, operating the communication control unit 104, the input unit 105, the output unit 106, etc. under the control of the CPU 101, and performing reading and writing of data in the main memory unit 102 or the auxiliary memory unit 103. The data or database necessary for processing is stored in the main memory unit 102 or the auxiliary memory unit 103.

Note that, although the search server 10 shown in FIG. 6 is configured by one computer, the functions of the search server 10 may be distributed to a plurality of computers. For example, the search server 10 may be configured by a computer including the databases shown in FIG. 5 and another computer having the other functions.

Referring back to FIG. 5, the facility database 11 is a means for storing facility information relating to a facility. As shown in FIG. 7, the facility information includes a location ID (facility ID) uniquely specifying a facility, geographical information indicating a geographical range considered as an area of the facility, and facility-related information including a facility name or an address, each user's comment relating to the facility, etc. The expressional form for the geographical information indicating a shape of a geographical range of a facility or the geographical range itself may be optionally determined. For example, as shown in FIG. 7, a geographical range having a radius of r from a center (x, y) may be expressed by position information of (x, y, r). In a place crowded with a plurality of facilities, geographical ranges of the facilities may overlap with each other. The location ID uniquely specifies just a facility itself and does not uniquely specify a geographical range thereof.

The facility list acquisition unit 12 is a means for extracting facility information of facilities existing around a portable terminal T, as a candidate facility list, based on a list request signal received from the portable terminal T. The facility list acquisition unit 12 extracts position information indicating a current position of the portable terminal T from a list request signal, compares the position information with facility information (geographical information) within the facility database 11, and then specifies facilities existing within a predetermined range from the current position of the portable terminal T. Note that the range for search for a facility may be optionally determined (for example, within a circle with a radius of 500 m, etc.). The facility list acquisition unit 12 reads facility information of one or more specified facilities from the facility database 11 and transmits the read facility information as a candidate facility list to the portable terminal T. This list is displayed on the screen Db as described above.

Note that the facility list acquisition unit 12 may specify facilities existing within a search range inputted by a user. In this case, information indicating the search range is included in the list request signal, and the facility list acquisition unit 12 specifies facilities within the range.

The input information registration unit 13 is a means for receiving input information transmitted from the portable terminal T and updating the input information database 14 based on the input information. The input information registration unit 13 generates input operation position information by associating the received user ID and the position information with each other, and registers the input operation position information in a position information table 14a of the input information database 14. The input operation position information is a part of the input information and is information showing a relation between position information indicating a geographical position (position where a facility is located) and a user having inputted the position information. In addition to registration of the input operation position information as described above, when the input information includes new facility information, the input information registration unit 13 registers the received input information in a facility table 14b of the input information database 14.

The input information database 14 is a means for storing input information transmitted from the portable terminal T. The input information database 14 includes a position information table 14a and a facility table (input information storage means, result storage means) 14b.

The position information table 14a is a means for storing input operation position information generated by the input information registration unit 13. An example of the position information table 14a is shown in FIG. 8.

The facility table 14b is a means for storing a record composed of a location ID and input information including new facility information (input facility information). The input information is recorded by the input information registration unit 13 and the location ID is recorded by the association unit 18 described later. In the following description, a geographical position indicated by position information recorded in the facility table 14b is referred to as an "input position". An example of the facility table 14b is shown in FIG. 9.

Since the input information is frequently sent to the search server 10 from each portable terminal T, input operation position information and input information are accumulated in the position information table 14a and the facility table 14b, respectively. For one facility, a plurality of users may input facility information as a new facility. However, position information (latitude and longitude) acquired at the time of generation of input information may vary according to each portable terminal T and input contents may also vary according to each user. Hence, only viewing input information stored in the facility table 14b is not enough to determine which facility is indicated by the input information or which input information indicates a particular facility. Therefore, a process for associating a facility and input information with each other is performed in the present embodiment, a detailed description of which is given later.

The category dictionary database 15 is a means for storing data of a dictionary defining associations between terms. The category dictionary database 15 stores dictionary data (hereinafter, referred to as "category dictionary data") including associations between different category names given by different users. An example of the category dictionary data is shown in FIG. 10. The category dictionary data is generated by the dictionary registration unit 16.

The dictionary registration unit 16 is a means for generating category dictionary data by associating different category names given by different users with each other, and then storing the category dictionary data in the category dictionary database 15.

First, the dictionary registration unit 16 reads input information (first input information) indicating a position at which one category name (first category name) is given by one user (first user) and input information (second input information) indicating a position at which one category name (second category name) is given by another user (second user), from the facility table 14b.

Then, based on the first and second input information, the dictionary registration unit 16 determines whether the two users have given the category names at a predetermined number or more of common positions. However, since the position indicated by the input information is latitude and longitude, even when a plurality of users have individually given category names to one facility, it is usual that pieces of position information within the input information corresponding to these category names are different from each other. Therefore, when a plurality of positions indicated by respective pieces of position information are included in a predetermined geographical range (for example, within a circle with a radius of several tens of meters), the dictionary registration unit 16 determines that the positions are common. Based on the first and second input information, the dictionary registration unit 16 obtains the number of places where the positions at which the first and second users have given the category names are common, and determines whether the obtained number is larger than or equal to a predetermined number. As a threshold value for this determination, for example, 2 or 3 may be used. Of course, another value may be used as the threshold value. Note that the geographical range used by the dictionary registration unit 16 may be either a range indicated by geographical information or a range defined independently from the geographical information.

When the number of common positions is smaller than a predetermined number, the dictionary registration unit 16 terminates the processing of the read first and second input information. On the other hand, when the number of common positions is larger than or equal to the predetermined number, the dictionary registration unit 16 generates category dictionary data by associating the first category name and the second category name with each other and registers the category dictionary data in the category dictionary database 15.

The dictionary registration unit 16 performs a series of processes as described above for each category name of each user. As a result, a category dictionary database 15 is generated.

The processing of the dictionary registration unit 16 as described above is now discussed by giving an example. Each mark shown in maps M of FIGS. 11(a) and 11(b) corresponds to input information shown in FIG. 9 and each dotted circle indicates a geographical range considered as a common position. The threshold value is set as 2. In the following description, input information relating to a certain category name of a certain user ID is expressed in the form of "(user ID, category name)".

In the example shown in FIG. 11(a), the combination of (user A, café) and (user B, tea) has two places, each of which is considered as a common position, and the combination of (user A, café) and (user C, study place) also has two places, each of which is considered as a common position. Therefore, the dictionary registration unit 16 resultantly generates category dictionary data in which the three category names of "café", "tea", and "study place" are associated with each other.

On the other hand, in the example shown in FIG. 11(b), none of the combinations between (user A, café), (user B, tea), and (user C, study place) have more than one place which is considered as a common position. In this case, the dictionary registration unit 16 does not generate category dictionary data.

The decision unit 17 is a means for deciding whether a plurality of common users has inputted position information in a predetermined number or more of common geographical ranges.

The decision unit 17 reads input operation position information corresponding to a plurality of common users from the position information table 14a. Thereafter, based on the read input operation position information, the decision unit 17 determines whether the plurality of common users have registered position information at a predetermined number or more of common positions. Hereinafter, in order to facilitate the understanding, a method of determining an overlapping of position information based on position information registered by two common users will be described in detail.

First, the decision unit 17 reads input operation position information (first input operation position information) indicating a position given by one user (first user) and input operation position information (second input operation position information) indicating a position given by another user (second user), from the position information table 14a.

Then, based on the first and second input operation position information, the decision unit 17 determines whether the two users have inputted position information at a predetermined number or more of common positions. However, since the position indicated by the input operation position information is latitude and longitude, even when a plurality of users have individually inputted position information for one facility, it is usual that pieces of position information within the input operation position information corresponding to these pieces of inputted position information are different from each other. Therefore, when a plurality of positions indicated by respective pieces of position information are included in a predetermined geographical range (for example, within a circle with a radius of several tens of meters), the decision unit 17 determines that the positions are common. Here, the geographical range used by the decision unit 17 is a range indicated by geographical information. Based on the first and second input operation position information, the decision unit 17 obtains the number of places where the positions at which the first and second users have inputted position information are common, and determines whether the obtained number is larger than or equal to a predetermined number. As a threshold value for this determination, for example, 2 or 3 may be used. Of course, another value may be used as the threshold value.

When the number of common positions is smaller than a predetermined number, the decision unit 17 sets an association flag to OFF. On the other hand, when the number of common positions is larger than or equal to the predetermined number, the decision unit 17 sets an association flag to ON. Here, the association flag is information indicating whether position information inputted by a plurality of common users has been registered in a predetermined number or more of geographical ranges. When the association flag has been set to ON, association of input information is performed by the association unit 18 described later. On the other hand, when the association flag has been set to OFF, association is not performed. The association flag is set for each combination of a plurality of users.

The processing of the decision unit 17 as described above is now discussed by giving an example. Each mark shown in maps M of FIGS. 12(*a*) and 12(*b*) corresponds to input operation position information shown in FIG. 8 and each of dotted circles indicates a geographical range considered as a common position. The number (threshold value) of the common geographical ranges used in the determination is set as 2.

In the example shown in FIG. 12(*a*), user A and user B are common users and there are two places, each of which is considered as a common position, for the combinations of position information inputted by these two users. Therefore, the decision unit 17 determines that common users have inputted position information in a predetermined number or more of common geographical ranges and then sets an association flag corresponding to the combination of users A and B to ON.

On the other hand, in the example shown in FIG. 12(*b*), none of the combinations of position information inputted by users A and B have more than one place considered as a common position. Therefore, the decision unit 17 sets an association flag corresponding to the combinations of users A and B to OFF. Further, none of the combinations of position information inputted by users A and C have more than one place considered as a common position. Therefore, the decision unit 17 sets an association flag corresponding to the combinations of users A and C to OFF.

The decision unit 17 performs the above determination process for all user combinations and outputs an association flag set for each combination to the association unit 18.

Although combinations of two users are shown in the example illustrated in FIGS. 12(*a*) and 12(*b*), it is natural that the decision unit 17 may perform the above determination process for combinations of three or more users.

The association unit 18 is a means for associating multiple pieces of input information, which include position information indicating geographical positions included in a common geographical range and correspond to a plurality of common users, with each other.

First, the association unit 18 compares facility information in the facility table 14*b* and the position information in the facility table 14*b* with each other, and extracts input information registered in one geographical range indicated by facility information (geographical information), i.e. input information having an input position included in the geographical range. When only one piece of input information has been extracted, the association unit 18 performs a process of associating a location ID corresponding to the geographical range and the extracted input information with each other for the facility table 14*b*. On the other hand, when a plurality of input information have been extracted, the association unit 18 performs, by referring to the association flag, an update process of allocating an identical location ID to multiple pieces of input information satisfying a predetermined condition, for the facility table 14*b*. By this process, multiple pieces of input information are associated with each other through one location ID. Therefore, it can be said that the facility table 14*b* is a result storage means.

When a plurality of input information have been extracted, the association unit 18 decides whether a combination of user IDs having an association flag set to ON exists in a set of extracted user IDs, by referring to a plurality of user IDs indicated by the input information and association flags set for respective combinations of users. Then, when such a combination of user IDs exists, the association unit 18 extracts multiple pieces of input information corresponding to the combination of user IDs and groups those multiple pieces of input information. Subsequently, the association unit 18 associates an identical location ID with each of the grouped pieces of input information, so as to combine the input information.

Figure 15:
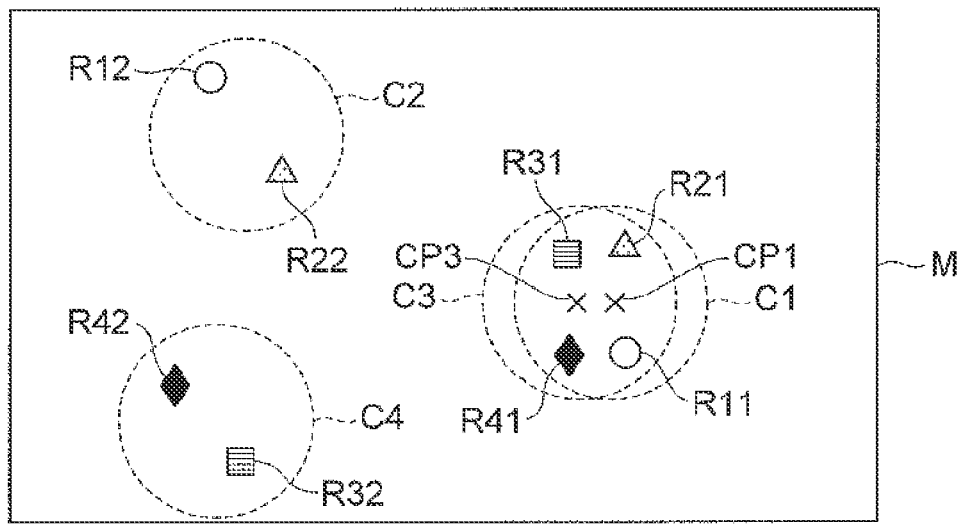
FIG. 15(a) is a view showing a relation between a geographical range of a facility and an input position of facility information.
FIG. 15(b) is a view showing allocation of a location ID to input information.
Figure 16:
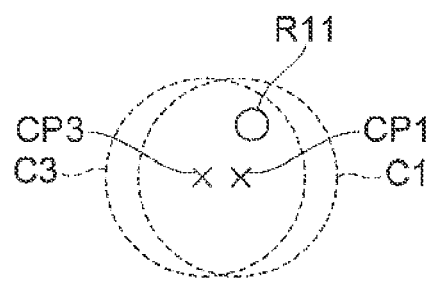
FIG. 16(a) is a view showing a relation between a geographical range of a facility and an input position of facility information.
FIG. 16(b) is a view showing allocation of a location ID to input information.

A specific example of the combining process is shown using FIG. 13(*a*) to FIG. 15(*b*). As shown in FIGS. 13(*a*) and 13(*b*), when only one piece of input information registered within the geographical range C1 corresponding to the location ID "0001", the association unit 18 allocates the location ID "0001" to the input information.

As shown in FIGS. 14(*a*) and 14(*b*), when user A and user B are inputting position information in the geographical range C1 corresponding to the location ID "0001" the geographical range C2 corresponding to the location ID "0002" in the map M, respectively, the decision unit 17 sets the association flag corresponding to the combination of users A and B of FIGS. 14(*a*) and 14(*b*) to ON.

When the association flag has been set as described above, the association unit 18 collects two pieces of input information relating to the positions R11 and R21 inputted within the geographical range C1 by the two common users A and B into one group Ga. Also, the association unit 18 collects two pieces of input information relating to the positions R12 and R22 inputted within the geographical range C2 by the users A and B into one group Gb.

Next, the association unit 18 associates a location ID corresponding to each geographical range with each of the grouped input information. In the case of this example, the association unit 18 associates a location ID "0001" corresponding to the geographical range C1 with the two pieces of input information relating to the positions R11 and R21 collected into the group Ga. Also, the association unit 18 associates a location ID "0002" corresponding to the geographical range C2 with the two pieces of input information relating to the positions R12 and R22 collected into the group Gb.

When a plurality of facilities are adjacent to each other, a geographical range of a facility of one side and a geographical range of a facility of the other side may overlap with each other and multiple pieces of input information relating to a plurality of facilities may thus belong to the overlapping part. On that account, the association unit 18 may generate a plurality of groups at the time of grouping process in a geographical range of a facility of one side.

For example, as shown in FIGS. 15(a) and 15(b), it is assumed that the geographical range C1 corresponding to the location ID "0001" and the geographical range C3 corresponding to the location ID "0003" overlap with each other and four pieces of input information relating to positions R11, R21, R31, and R41 have been registered in the overlapping part. Also, it is assumed that two pieces of input information relating to positions R12 and R22 have been registered in the geographical range C2 corresponding to the location ID "0002" and two pieces of input information relating to positions R32 and R42 have been registered in the geographical range C4 corresponding to the location ID "0004". In this case, as in the example shown in FIGS. 14(a) and 14(b), in consideration of the overlapping of the positions of the users A and B, the association unit 18 collects the two pieces of input information relating to positions R11 and R21 into group Ga and the two pieces of input information relating to positions R12 and R22 into group Gb. Further, in consideration of the overlapping of the positions of the users C and D, the association unit 18 collects the two pieces of input information relating to positions R31 and R41 into group Gc and the two pieces of input information relating to positions R32 and R42 into group Gd.

The association unit 18 allocates a location ID "0002" and a location ID "0004" to the two pieces of input information relating to positions R12 and R22 grouped into the group Gb and the two pieces of input information relating to positions R32 and R42 grouped into group Gd, respectively. In contrast, like the four pieces of input information relating to the positions R11, R21, R31, and R41, when input information corresponding to an overlapping part between a plurality of geographical ranges exists, the association unit 18 needs to determine which location ID it will allocate to the input information. In regard to a method for the determination, two examples are shown hereinafter.

The first method is to automatically determine an allocated ID based on a positional relation between an input position indicated by position information and a center of a geographical range. The association unit 18 may obtain a midpoint of respective positions indicated by respective pieces of input information within a group and then allocate a location ID of facility information, of which a center of geographical range is nearest to the midpoint, to the group.

In the example shown in FIGS. 15(a) and 15(b), the center CP1 of the geographical range C1 is nearest to the midpoint of the two points corresponding to the group Ga and the center CP3 of the geographical range C3 is nearest to the midpoint of the two points corresponding to the group Gc. Accordingly, the association unit 18 allocates an identical location ID "0001" to the two pieces of input information relating to the positions R11 and R21 and allocates an identical location ID "0003" to the two pieces of input information relating to the positions R31 and R41.

An allocation of a location ID as described above is also performed in the case in which only one piece of input information belonging to the overlapping part exists. In an example shown in FIGS. 16(a) and 16(b), the center CP1 of the geographical range C1 is nearest to the position R11, and the input information database 14 thus allocates a location ID "0001" to the input information relating to the position R11.

The second method is to allocate a location ID designated by a human being. The association unit 18 generates inquiry information for inquiring about which facility the grouped multiple pieces of input information shall be associated with, and then transmits the inquiry information to a predetermined terminal. The inquiry information includes grouped input information and candidates of a location ID (facility information). The destination of the inquiry information may be either a terminal (not shown) of a manager of the search server 10 or a portable terminal T of a user. In a terminal having received the inquiry information, an operation of associating is performed by a user of the terminal, and reply information indicating a facility designated by this operation is then transmitted to the search server 10. The association unit 18 receives the reply information and allocates a location ID of the facility indicated by the reply information to respective input information.

In the example shown in FIGS. 15(a) and 15(b), the association unit 18 transmits two pieces of input information belonging to the group Ga, two pieces of input information belonging to the group Gc, and facility information relating to the location IDs "0001" and "0003" to a predetermined terminal. In the example shown in FIGS. 16(a) and 16(b), the association unit 18 transmits input information relating to the position R11 and facility information relating to the location IDs "0001" and "0003" to a predetermined terminal. The receiving terminal displays the received information and receives an input operation for association, and then transmits reply information based on the input operation to the search server 10. Based on the reply information, the association unit 18 allocates a location ID to respective input information, for example, as shown in FIG. 15(b) or FIG. 16(b).

The association unit 18 performs an associating between input information and a location ID for a geographical range of each facility. Moreover, in a case in which the association unit 18 has not been able to extract even one piece of input information corresponding to a certain geographical range, the association unit 18 terminates the processing relating to the geographical range and then shifts to a next geographical range.

Referring back to FIG. 5, the request receiving unit 19 is a means for receiving a request signal, which indicates a request for facility information to be displayed on the screens De and Df, from a portable terminal T. The request receiving unit 19 outputs a received request signal to the search unit 20.

The search unit 20 is a means for reading facility information corresponding to an inputted request signal from the facility database 11. First, the search unit 20 extracts an designated category name and position information from a request signal. Then, the search unit 20 extracts another category name (hereinafter, referred to as "associated category name") associated with the designated category name from the category dictionary database 15. On the premise of FIG. 10, the search unit 20 extracts, for example, "tea" and "study place" related to the designated category name "café".

Subsequently, by referring to the facility database 11 and the facility table 14b, the search unit 20 reads facility information of facilities existing within a predetermined geographical range from a current position of a portable terminal T indicated by a position information, which includes an designated category name or associated category names, from the facility database 11. Since the facility database 11 and the facility table 14b are associated with each other through a location ID, such a search as described above is possible. Note that a search range of a facility may be optionally determined (for example, within a circle with a radius of 500 m). The search unit 20 outputs extracted facility information to the result transmitting unit 21.

Note that the search unit 20 may extract information of facilities existing within a search range inputted by a user. In this case, information indicating the search range is included in the request signal, and the search unit 20 extracts facilities within the range.

The result transmitting unit 21 is a means for transmitting facility information inputted from the search unit 20 to a portable terminal T, which is a transmitting source of a request signal, as a search result. The portable terminal T displays screens De and Df by using the facility information.

Figure 17:
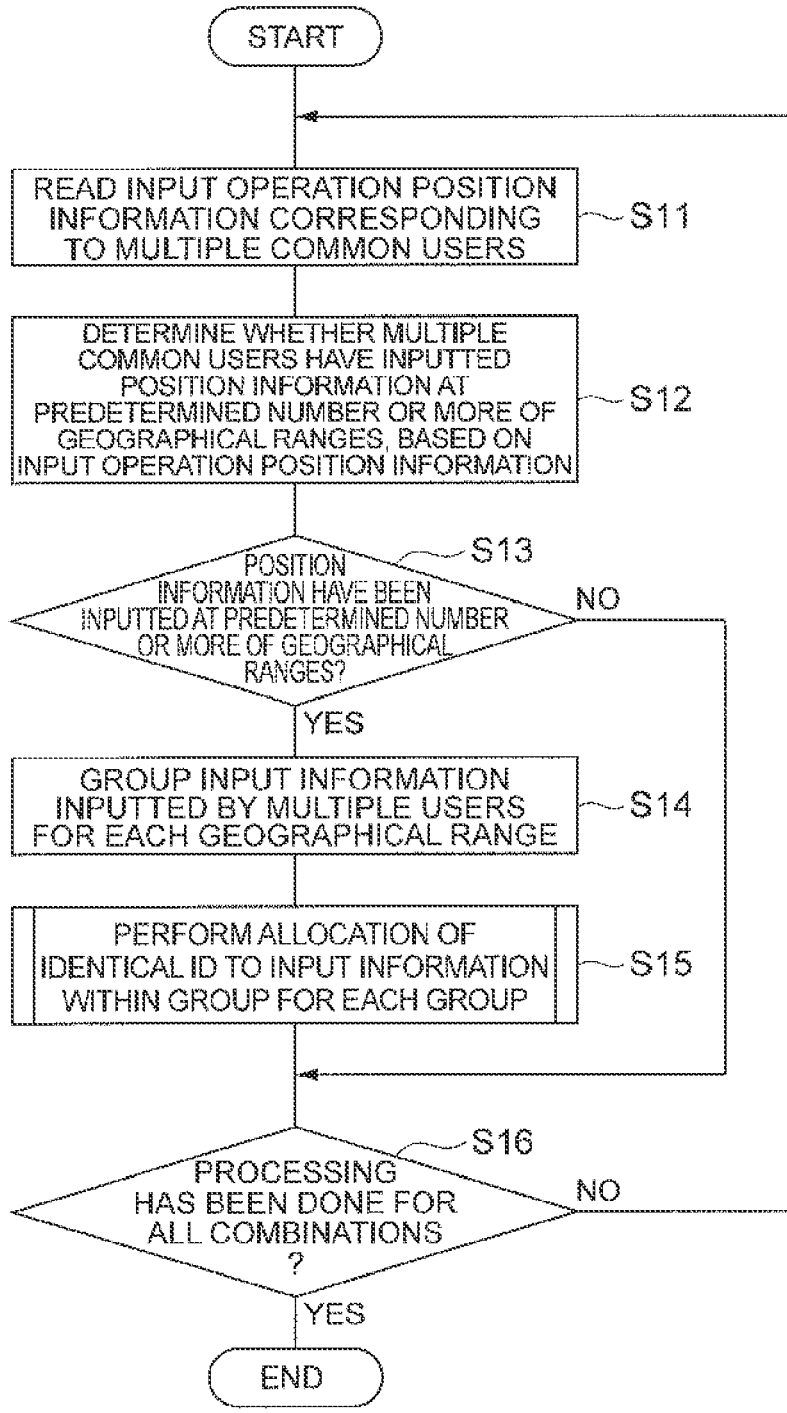
FIG. 17 is a flowchart illustrating an information management method in the search server shown in FIG. 1.

Next, by using FIG. 17 and FIG. 18, an operation of the search server 10 will be described and an information management method according to the present embodiment will be described. The following description is based on a premise that at least a predetermined number of pieces of input information have been stored in the facility table 14b based on input information received from each portable terminal T.

First, the decision unit 17 reads input operation position information corresponding to a plurality of users (two users in the example of FIG. 12) from the position information table 14a (step S11). Then, based on the read input operation position information, the decision unit 17 determines whether the plurality of users have inputted position information at a predetermined number or more (threshold value or more) of common positions (step S12). Then, when the position information have been inputted at a predetermined number or more of common positions (step S13; YES), the association unit 18 groups the input information inputted by the plurality of users for each geographical range (step S14), and performs a process of allocating an identical location ID to input information within each group (step S15). The decision unit 17 and the association unit 18 perform the process of steps S11 to S15 as described above for all combinations of the users (step S16). In this way, it can be said that the process of steps S11 to S16 includes a decision step, an association step, and a registration step.

Allocation of a location ID to grouped input information (step S15) is performed as shown in FIGS. 18(a) and 18(b). Here, FIG. 18(a) shows the first method (automatic allocation) and FIG. 18(b) shows the second method (allocation based on an designation in a terminal).

First, the association unit 18 determines the number of geographical ranges to which a group of input information belongs (step S151). Then, when the group belongs to only one geographical range (step S151, "1"), the association unit 18 allocates a location ID corresponding to the geographical range to each piece of input information within the group (step S152).

On the other hand, when the group belongs to a plurality of geographical ranges (step S151, "plurality"), the association unit 18 needs to determine a location ID to be allocated to each piece of input information of the group. In the case of the first method, the association unit 18 specifies a geographical range having a center nearest to a midpoint of positions indicated by respective pieces of input information within the group (steps S153A) and allocates a location ID corresponding to the specified geographical range to each piece of input information of the group (steps S154A). In contrast, in the case of the second method, the association unit 18 transmits inquiry information including each piece of input information within a group and candidates of a location ID (facility ID) to a predetermined terminal (step S153B). Thereafter, based on reply information received from the terminal, the association unit 18 allocates a location ID designated by an input operation in the terminal to each piece of input information (step S154B).

Figure 19:
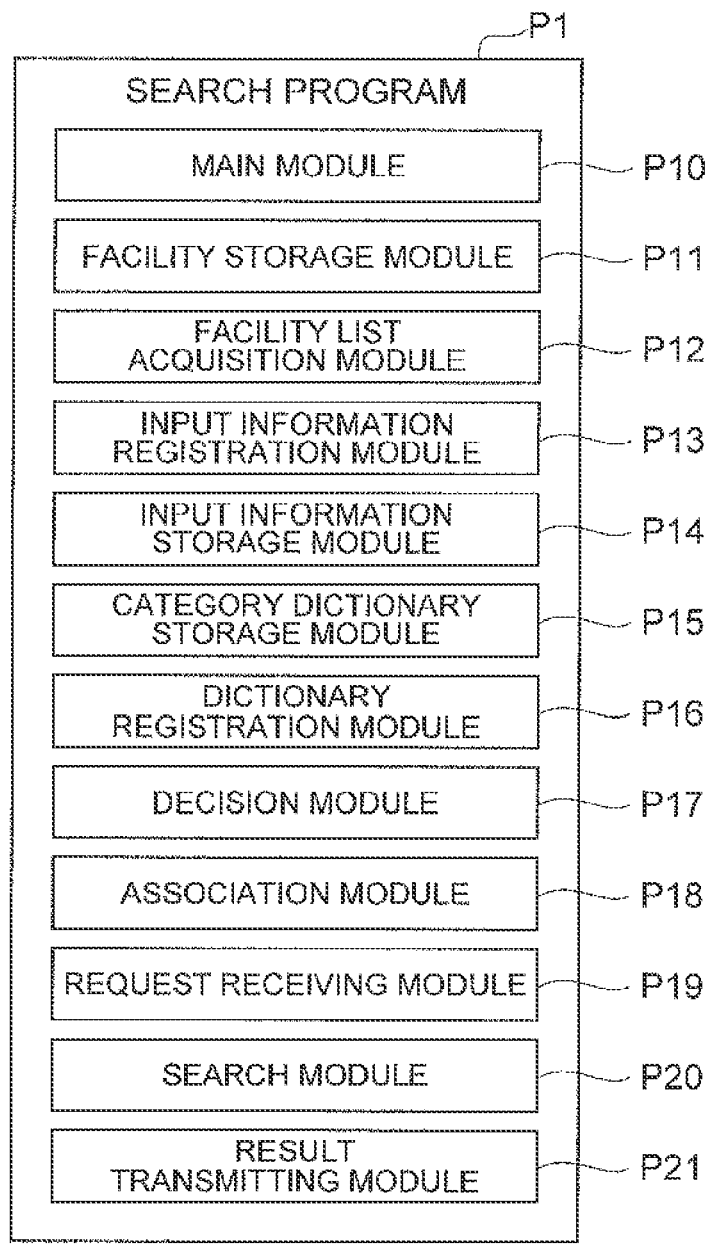
FIG. 19 is a view illustrating a configuration of a search program according to an aspect.

Next, a search program (information management program) P1 for allowing a computer to function as a search server 10 will be described using FIG. 19.

The search program P1 includes a main module P10, a facility storage module P11, a facility list acquisition module P12, an input information registration module P13, an input information storage module P14, a category dictionary storage module P15, a dictionary registration module P16, a decision module P17, an association module P18, a request receiving module P19, a search module P20, and a result transmitting module P21.

The main module P10 is a part which generally controls the information management function or the search function. The functions implemented by executing the facility storage module P11, the facility list acquisition module P12, the input information registration module P13, the input information storage module P14, the category dictionary storage module P15, the dictionary registration module P16, the decision module P17, the association module P18, the request receiving module P19, the search module P20, and the result transmitting module P21 are the same as the functions of the facility database 11, the facility list acquisition unit 12, the input information registration unit 13, the input information database 14 (including the position information table 14a and the facility table 14b), the category dictionary database 15, the dictionary registration unit 16, the decision unit 17, the association unit 18, the request receiving unit 19, the search unit 20, and the result transmitting unit 21.

The search program P1 is provided after being recorded in a material recording medium, such as a CD-ROM, DVD, a ROM, or a semiconductor memory. Further, the search program P1 may be provided through a communication network as a data signal superposed on a carrier wave.

As described above, according to the present embodiment, when it has been determined that a plurality of common users performed input operations in a predetermined number or more of common geographical ranges, pieces of input information of the plurality of common users corresponding to each of the common geographical ranges are associated with each other by a common location ID and are then registered. In this way, pieces of input information are grouped in consideration of overlapping of positions at which user's input operations have been performed and a common identifier is then given to the grouped input information, so that pieces of information relating to places inputted by respective users can be properly combined.

According to the present embodiment, even when there are a plurality of candidates for a facility (geographical range) with respect to multiple pieces of input information, it is possible to specify a facility corresponding to the multiple pieces of input information. By determining a location ID based on a positional relation between a midpoint of positions indicated by input information and each geographical range, it is possible to automatically determine a facility which is highly probable to correspond to multiple pieces of input information. Also, by determining a location ID allocated to input information based on a user operation, a facility corresponding to multiple pieces of input information can be determined just as the user's request.

The present invention has been described above in detail based on embodiments thereof. However, the present invention is not limited to the described embodiments. The present invention can be modified in various ways without departing from the main idea thereof.

The configurations of various data and databases are not limited to those described above. Although the search server 10 includes various databases in the above embodiments, another server other than the search server may include databases while allowing the search server to access the databases through a communication network to acquire information. For example, the search server may acquire facility information from a facility database installed within a predetermined facility management server, without including a database corresponding to the facility database 11.

In the above embodiments, position information included in input information is expressed in the form of latitude and longitude. However, the expressional form of the position information is not limited to the latitude and longitude. For example, the position information may be expressed in another form (for example, an address, etc.) other than the latitude and longitude.

Also, the position information may be expressed three-dimensionally by latitude, longitude, and altitude. In this case, input information including position information indicated by, for example, (x11, y11, z11) is accumulated. In this case, a geographical range including positions considered as common by the decision unit 17 and the association unit 18 or a geographical range indicated by geographical information is also expressed three-dimensionally (for example, a range indicated by a virtual cylinder having a radius of several tens of meters and a height of several meters). By using three-dimensionally expressed position information, it is possible to properly combine input information in consideration of height as well as the planar range. For example, it is possible to distinguish each of input information corresponding to different floor in the same building.

When a search means searches for facility information, the search means may acquire user relation information showing a relation (for example, "friendship", etc.) to the user, and extract facility information by using the acquired information. The user relation information may be acquired from, for example, a database storing information of friendship registered by a user on a predetermined Social Networking Service (SNS).

For example, the search means extracts only facility information including position information inputted by a user (request user) requesting facility information and a person having a predetermined relation to the user in user relation information. In this case, the request signal includes user range information (for example, user range information which indicates "searching for facilities registered by a friend") indicating a search range based on a user relation. The search means compares user range information, user relation information, and the facility information extracted as described above with each other, and outputs only facility information existing within a search range indicated by the user range information, as a search result.

The search means may determine a display order in screen De for each piece of facility information extracted based on the user relation information. For example, the search means may determine the display order such that facility information given a category by a person having a predetermined relation with a request user in user relation information is displayed with a higher rank than facility information given a category by a person having no relation with the request user in the user relation information.

REFERENCE SIGNS LIST

10: search server, 11: facility database, 12: facility list acquisition unit, 13: input information registration unit, 14: input information database, 14a: position information table, 14b: facility table, 15: category dictionary database, 16: dictionary registration unit, 17: decision unit, 18: association unit, 19: request receiving unit, 20: search unit, 21: result transmitting unit, P1: search program (information management program), P10: main module, P11: facility storage module, P12: facility list acquisition module, P13: information registration module, P14: input information storage module, P15: category dictionary storage module, P16: dictionary registration module, P17: decision module, P18: association module, P19: request receiving module, P20: search module, P21: result transmitting module, T: portable terminal.

The invention claimed is:

1. A server, including at least one processor, comprising:
an input information storage unit configured to store input information in which position information, indicating a geographical position, and a user identification (ID), specifying a user having performed an input operation relating to the geographical position, are associated with each other;
a decision unit within said processor configured to determine whether each of a plurality of users performed the input operation in a geographical range, by referring to the input information storage unit;
an association unit within said processor configured to, when it is determined that each of the plurality of users performed the input operation in the geographical range, associate multiple pieces of the input information corresponding to the plurality of users and respectively including pieces of position information indicating geographical positions included in the geographical range, with each other by allocating a common identifier to the multiple pieces of the input information;
a registration unit within said processor configured to register the multiple pieces of the input information associated with each other by the association unit in a result storage unit; and
a facility storage unit configured to store facility information which is related to a facility and at least includes a facility ID specifying a facility and geographical information indicating a geographical range of the facility,
wherein the geographical range is the geographical range of the facility indicated by the geographical information, and
wherein the common identifier is the facility ID, and the facility ID corresponds to the geographical information corresponding to the multiple pieces of the input information.

2. The server according to claim 1, wherein when a plurality of geographical positions indicated by the multiple pieces of the input information are included in a geographical range indicated by one piece of facility information and a geographical range indicated by another piece of facility information, the association unit compares a midpoint of the plurality of the geographical positions corresponding to the plurality of users and a center of each geographical range with each other and allocates a facility ID corresponding to a geographical range having a center nearest to the midpoint to the multiple pieces of the input information.

3. The server according to claim 1, wherein when a plurality of geographical positions indicated by the multiple pieces of the input information are included in a geographical range indicated by one piece of facility information and a geographical range indicated by another piece of facility information, the association unit generates inquiry information for inquiring about which facility the multiple pieces of the input information shall be associated with, transmits the inquiry information to a predetermined terminal, receives reply information indicating a facility designated by a user of the terminal in response to the inquiry information from the terminal, and allocates a facility ID indicated by the received reply information to the multiple pieces of the input information.

4. The server according to claim 1, further comprising:
   a receiving unit configured to receive a request signal including the position information indicating a position of a terminal of a user from the terminal;
   a search unit configured to read facility information of facilities existing within a predetermined geographical range from the position indicated by the position information from the facility storage unit, by referring to the facility storage unit and the result storage unit based on the position information in the request signal received by the receiving unit; and
   a transmitting unit configured to transmit the facility information read by the search unit to the terminal.

5. The server according to claim 1, wherein the position information indicates the geographical position by at least latitude and longitude.

6. The server according to claim 5, wherein the position information indicates the geographical position by latitude, longitude, and altitude, and the geographical range is indicated by a three-dimensional shape.

7. An information management method executed by a server, comprising:
   a decision step of, by referring to an input information storage unit that stores input information, in which position information indicating a geographical position, and a user identification (ID), specifying a user having performed an input operation relating to the geographical position, are associated with each other, determining whether a plurality of users performed the input operation in a geographical range;
   an association step of, when it is determined that each of the plurality of users performed the input operation in the geographical range, associating multiple pieces of the input information corresponding to the plurality of users and respectively including pieces of position information indicating geographical positions included in the geographical range, with each other by allocating a common identifier to the multiple pieces of the input information; and
   a registration step of registering the multiple pieces of the input information associated with each other in the result storage unit by the association step; wherein
   a facility storage unit stores facility information which is related to a facility and at least includes a facility ID specifying a facility and geographical information indicating a geographical range of the facility,
   wherein the geographical range is the geographical range of the facility indicated by the geographical information, and
   wherein the common identifier is the facility ID, and the facility ID corresponds to the geographical information corresponding to the multiple pieces of the input information.

8. A non-transitory computer-readable recording medium with an information management program recorded therein, wherein the information management program allows a computer to function as:
   an input information storage unit configured to store input information in which position information, indicating a geographical position, and a user identification (ID), specifying a user having performed an input operation relating to the geographical position, are associated with each other;
   a decision unit configured to determine whether a plurality of users performed the input operation in a geographical range, by referring to the input information storage unit;
   an association unit configured to, when it is determined that each of the plurality of users performed the input operation in the geographical range, associate multiple pieces of the input information corresponding to the plurality of users and respectively including pieces of position information indicating geographical positions included in the geographical range, with each other by allocating a common identifier to the multiple pieces of the input information;
   a registration unit configured to register the multiple pieces of the input information associated with each other in a result storage unit by the association unit; and
   a facility storage unit configured to store facility information which is related to a facility and at includes a facility ID specifying a facility and geographical information indicating a geographical range of the facility,
   wherein the geographical range is the geographical range of the facility indicated by the geographical information, and
   wherein the common identifier is the facility ID, and the facility ID corresponds to the geographical information corresponding to the multiple pieces of the input information.

9. The server according to claim 2, further comprising:
   a receiving unit configured to receive a request signal including the position information indicating a position of a terminal of a user from the terminal;
   a search unit configured to read facility information of facilities existing within a predetermined geographical range from the position indicated by the position information from the facility storage unit, by referring to the facility storage unit and the result storage unit based on the position information in the request signal received by the receiving unit; and
   a transmitting unit configured to transmit the facility information read by the search unit to the terminal.

10. The server according to claim 3, further comprising:
    a receiving unit configured to receive a request signal including the position information indicating a position of a terminal of a user from the terminal;
    a search unit configured to read facility information of facilities existing within a predetermined geographical range from the position indicated by the position information from the facility storage unit, by referring to the facility storage unit and the result storage unit based on the position information in the request signal received by the receiving unit; and
    a transmitting unit configured to transmit the facility information read by the search unit to the terminal.

11. The server according to claim 1, wherein the position information indicates the geographical position by at least latitude and longitude.

12. The server according to claim 2, wherein the position information indicates the geographical position by at least latitude and longitude.

13. The server according to claim 3, wherein the position information indicates the geographical position by at least latitude and longitude.

14. The server according to claim 4, wherein the position information indicates the geographical position by at least latitude and longitude.

15. The server according to claim 9, wherein the position information indicates the geographical position by at least latitude and longitude.

16. The server according to claim 10, wherein the position information indicates the geographical position by at least latitude and longitude.

\* \* \* \* \*